US012776911B2

(12) United States Patent
Sudhakaran et al.

(10) Patent No.: US 12,776,911 B2
(45) Date of Patent: Oct. 27, 2026

(54) IDENTITY AUTHENTICATION AND AUTHORIZATION ADAPTER

(71) Applicant: HEWLETT PACKARD ENTERPRISE DEVELOPMENT LP, Spring, TX (US)

(72) Inventors: Sonu Sudhakaran, Bangalore (IN); Tejaswi Bangalore Rajeevalochanam, Bangalore (IN); Sathya Shankar K A, Bangalore (IN); Manjunath Patil, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 17 days.

(21) Appl. No.: 19/064,377

(22) Filed: Feb. 26, 2025

(65) Prior Publication Data

US 2026/0163736 A1 Jun. 11, 2026

(30) Foreign Application Priority Data

Dec. 5, 2024 (IN) ............................ 202441096346

(51) Int. Cl.
*H04L 9/32* (2006.01)
*H04L 9/08* (2006.01)

(52) U.S. Cl.
CPC .......... *H04L 9/3213* (2013.01); *H04L 9/0847* (2013.01)

(58) Field of Classification Search
None
See application file for complete search history.

(56) References Cited

U.S. PATENT DOCUMENTS

| | | | | |
|---|---|---|---|---|
| 10,757,089 | B1 * | 8/2020 | Hohler | H04L 63/0807 |
| 12,676,751 | B2 * | 7/2026 | Zilbershtein | H04L 9/3242 |
| 2016/0306955 | A1 * | 10/2016 | Martin | G06F 21/34 |
| 2017/0230351 | A1 * | 8/2017 | Hallenborg | H04L 63/08 |
| 2019/0372962 | A1 * | 12/2019 | Maria | H04L 63/108 |
| 2026/0222400 | A1 * | 7/2026 | Liang | H04L 63/083 |

OTHER PUBLICATIONS

Ethelbert, O., Moghaddam, F.F., Wieder, P. and Yahyapour, R., Aug. 2017. A JSON token-based authentication and access management schema for cloud SaaS applications. In 2017 IEEE 5th international conference on future internet of things and cloud (FiCloud) (pp. 47-53). IEEE. (Year: 2017).*

(Continued)

*Primary Examiner* — Luu T Pham
*Assistant Examiner* — Edward X Long
(74) *Attorney, Agent, or Firm* — Slater Matsil, LLP

(57) ABSTRACT

In certain examples, a method includes receiving, from a requesting entity and at an authentication and authorization adapter, an incoming request token, an app token, and a requested action set; assessing, by the authentication and authorization adapter, the incoming request token to determine an incoming request token type; providing, by the authentication and authorization adapter, the incoming request token and the requested action set to a particular identity access management (IAM) system of a plurality of IAM systems of a private cloud based on the incoming request token type; and providing, by the authentication and authorization adapter, an access response to the requesting entity based on an IAM response from the particular IAM system.

17 Claims, 6 Drawing Sheets

(56) References Cited

OTHER PUBLICATIONS

Fugkeaw, S., 2023. Achieving decentralized and dynamic sso-identity access management system for multi-application outsourced in cloud. IEEE Access, 11, pp. 25480-25491. (Year: 2023).*

Github, "chriskempson / tomorrow-theme", available online at <https://web.archive.org/web/20240406103215/ https://github.com/chriskempson/tomorrow-theme>, Apr. 6, 2024, 5 pages.

Github, "vscode_extensions_markdown-language-features_media_markdown.css at main • microsoft_vscode", retrieved on Jul. 2, 2025, 6 pages.

* cited by examiner

IDENTITY AUTHENTICATION AND AUTHORIZATION ADAPTER

BACKGROUND

Computing resources (e.g., hardware resources, software resources) may be deployed as part of a cloud environment. Access to resources in a cloud environment is often subjected to at least some form of access control, through which users may be authenticated, and authenticated users may be authorized to access at least some portion of the computing resources in the cloud environment.

BRIEF DESCRIPTION OF THE DRAWINGS

Certain examples discussed herein will be described with reference to the accompanying drawings listed below. However, the accompanying drawings illustrate only certain aspects or implementations of examples described herein by way of example, and are not meant to limit the scope of the claims. Aspects of the present disclosure are best understood from the following detailed description when read with the accompanying figures. For a more complete understanding of this disclosure, and advantages thereof, reference is now made to the following descriptions taken in conjunction with the accompanying drawings, in which:

Figure 1:
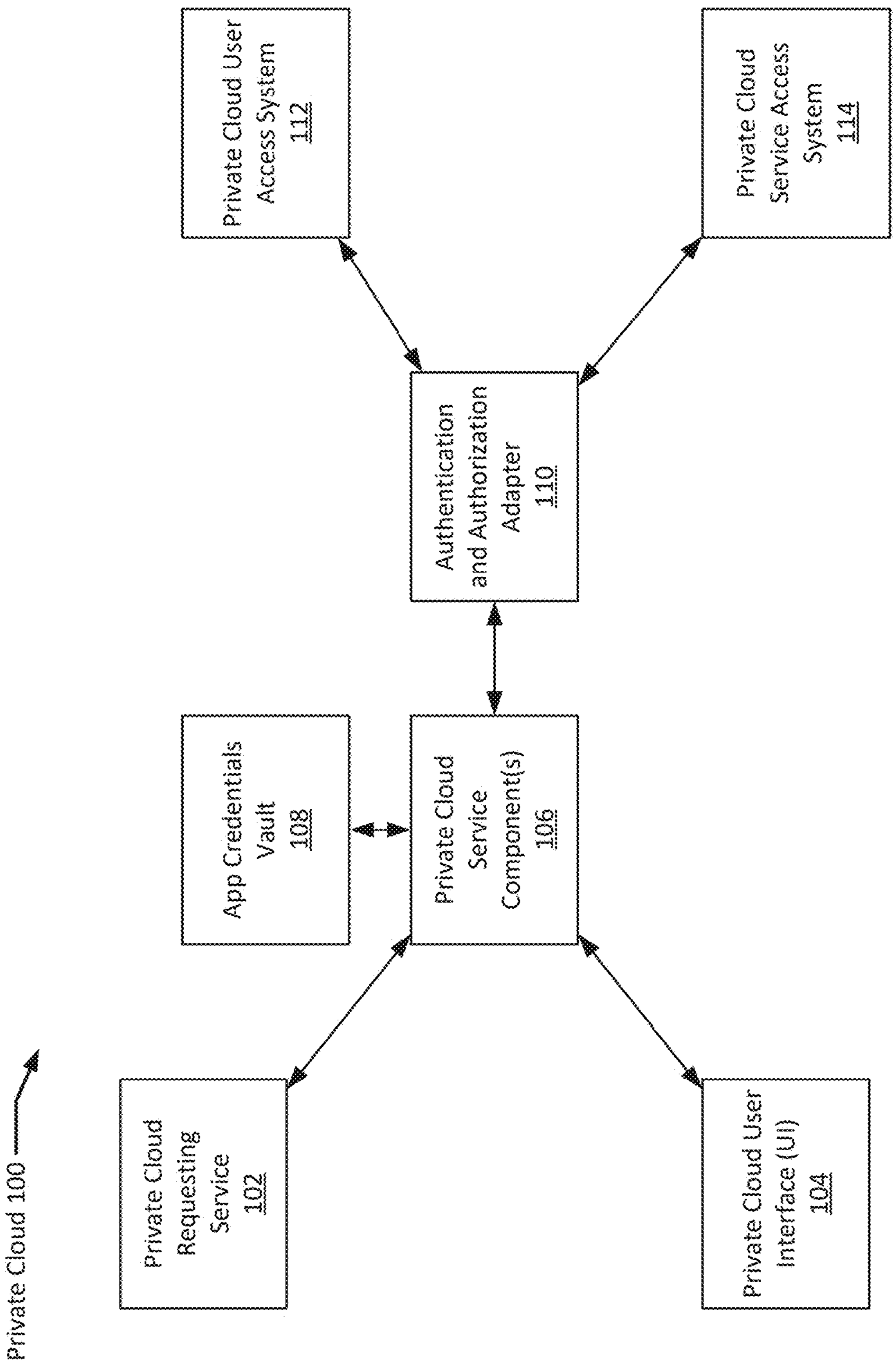
FIG. 1 shows a block diagram of a private cloud in accordance with one or more examples disclosed herein.

The figures are drawn to illustrate various aspects of the disclosure and are not necessarily drawn to scale.

DESCRIPTION

The following disclosure provides many different examples for implementing different features. Specific examples of components and arrangements are described below to simplify the present disclosure. These are, of course, merely examples and are not intended to be limiting.

Entities may seek an environment of computing resources for performing various tasks, operations, activities, and the like, and/or in which various applications, services, and the like may be operated and/or provided. Such an environment may be referred to as a cloud environment. Resources in a cloud environment may be obtained, for example, from a cloud services provider, which may provide hardware resources, software resources, management services, and/or any other relevant components and/or services to be deployed as the cloud environment. In some circumstances, such entities may seek to retain at least some degree of control over such an environment by having at least some control of the physical computing resources (e.g., computing devices, network devices, storage devices, management devices, and the like) and/or logical resources (e.g., software, applications, services, container platforms, management techniques, and the like). An environment in which such an entity maintains such control may be referred to as a private cloud. In one or more examples, a private cloud is an environment in which all or any portion of physical and/or logical computing resources are managed, used, or otherwise maintained by a particular entity (e.g., a company) or set of entities and are intended for the use of the entity or set of entities that maintain the private cloud.

As an example, a particular entity may seek and acquire physical components, such as computing devices, networking equipment, storage devices, infrastructure components, and other components, such as management software, applications, services, other software, and the like from a provider of such resources, and deploy the resources at one or more physical sites as a private cloud. A private cloud may include external network connections (e.g., a connection to the Internet) through which a connection to an external entity, referred to herein as a cloud services provider or private cloud provider, may exist, and through which the private cloud provider may provide private cloud services such as management services, software updates, software lifecycle management services, device lifecycle management services, health monitoring, and the like. In other scenarios, a private cloud may be a disconnected private cloud, where the computing resources maintained by the entity exist at one or more physical locations, and are not connected to an external network, such as the Internet.

In one or more examples, to facilitate use of a private cloud, a private cloud provider may provide a private cloud platform, through which administrators and users of the private cloud may manage, use, and/or otherwise interact with computing resources of the private cloud. In one or more examples, a private cloud platform may use techniques for authentication and authorization of users and other entities (e.g., software services) to use the resources therein. As an example, users of resources in a private cloud may require access to and/or authorization for using services provided by a private cloud provider as part of the private cloud platform (e.g., access to and/or use of a virtual machine as-a-service (VMaaS) service, a bare metal as-a-service (BMaaS) service, and the like), and may also require access and/or authorization to use other applications, services, and the like deployed within the private cloud. Additionally, within a private cloud, certain services (e.g., VMaaS) may, from time to time, be configured to access and/or use other services (e.g., VM backup services). In one or more examples, a user attempting to access services and/or resources within a private cloud may require using one or more particular identity access management (IAM) system (e.g., PingFederate), while services attempting to access other services may require using a different IAM system (e.g., Keycloak).

In such a scenario, it may be complicated to perform authentication and/or authorization of a user using one or more IAM services, while at the same time having to use a different IAM service for certain services to access and/or use other services. Examples disclosed herein address such challenges by implementing a single authentication and authorization adapter that is configured to receive incoming requests for authentication and authorization, and to provide a response thereto by directing the request to an IAM system that appropriately corresponds to the request (e.g., a particular IAM system for a user request, and a different IAM system for a service request). In one or more examples, the authentication and authorization adapter may simplify the authorization and authentication of entities for accessing resources and/or performing actions within a private cloud by allowing private cloud services to interact with the authentication and authorization adapter, regardless of which IAM system in the private cloud is responsible to approving or denying the access and/or actions.

In one or more examples, when a user accesses a private cloud platform, the user may be authenticated by a first IAM system (e.g., PingFederate) of the private cloud platform, and the user may be issued an incoming request token from the first IAM system (which may be referred to as an issuer) implemented within the private cloud platform. When a user attempts to access a resource, such as a BMaaS service, within a private cloud (e.g., by accessing a web-based interface and accessing a link to a service), the incoming request token may be provided to the private cloud service that the user is attempting to access. The service that the user is attempting to access (e.g., BMaaS) may either have, or takes steps to obtain, an app token. An app token may be a token that includes information that allows the service to be validated. The service may then provide the incoming request token, the app token, and a set of one or more requested actions that the user is attempting to perform (e.g., read a configuration, modify a configuration, delete a configuration, and the like) to the authentication and authorization adapter. In one or more examples, the authentication and authorization adapter uses the app token to validate the service from which the app token was provided. When the service is validated via the app token, the authentication and authorization adapter may assess the incoming request token to determine that the incoming request token is a user token, based on an assessment of an issuer field within the token. In one or more examples, in the case of a user token, the issuer will be a user identity provider of the private cloud platform (e.g., PingFederate). Based on the issuer of the incoming request token indicating that the token is a user token, the authentication and authorization adapter may send an authentication and authorization request to the first IAM service, which authenticates the identity of the user, and authorizes or denies the action that the user is attempting to perform.

When a service (which may be referred to as a requesting service) within a private cloud seeks to invoke the use of another service (e.g., when a VMaaS service seeks to invoke a VM backup service), the requesting service may also need to be authenticated and authorized to perform such an action. To that end, in some implementations, the requesting service may seek or otherwise be provided an incoming request token that is a service token. Provided that the service is valid, the incoming request token may be issued to the requesting service as a service token, which may be issued by a different IAM service (as the issuer) than that which issues a user token (e.g., the service token may be issued by Keycloak rather than PingFederate). Once the service has obtained the service token, the service token may be provided from the requesting service (e.g., VMaaS) to another service (e.g., a backup service) from which some action is requested (e.g., perform a backup). In one or more examples, the service that the requesting service is attempting to access (which may be referred to as a requested service) either has, or takes steps to obtain, an app token. The requested service may then provide the incoming request token (in this case, the service token from the requesting service), the app token corresponding to the requested service, and a set of one or more actions that the requesting service is requesting the requested service to perform, to the authentication and authorization adapter. In some implementations, the to the authentication and authorization adapter uses the app token to validate the service from which the app token was provided. In other implementations, app token may instead be validated by the service identity provider instead of the authentication and authorization adapter. In one or more examples, when the requested service is validated via the app token, the authentication and authorization adapter assesses the incoming request token to determine that the incoming request token is a service token, based on an assessment of an issuer field within the token. In the case of a service token, the issuer may be a service identity provider of the private cloud platform (e.g., Keycloak). In one or more examples, based on the issuer of the incoming request token indicating that the token is a service token, the authentication and authorization adapter sends an authentication and authorization request to a second IAM service (e.g., Keycloak), which authenticates the identity of the service from which the request was issued, and authorizes or denies the action that the service is attempting to perform. In some scenarios, the second IAM service may also receive and assess the app token to authenticate the requested service.

Thus the authentication and authorization adapter may be configured to be the entity to which requests in a private cloud are provided to determine whether the requesting entity (e.g., a user or a service) is authenticated and/or authorized to perform whatever action is being requested. In one or more examples, the authentication and authorization adapter is configured to assess an incoming request token associated with the requesting entity to determine whether the incoming request token is a user token or a service token (e.g., by assessing an issuer field within the token). In some implementations, the authentication and authorization adapter is configured to provide the incoming request token, and the set of one or more actions being requested to one of a plurality on IAM systems, with the particular IAM system to which the authentication and authorization adapter sends the request being determined by the type or token associated with the requesting entity.

FIG. 1 shows a block diagram of a private cloud 100 in accordance with one or more examples disclosed herein. As shown in FIG. 1, the private cloud 100 includes a private cloud requesting service 102, a private cloud user interface (UI) 104, one or more private cloud service component(s) 106, and app credentials vault 108, an authentication and authorization adapter 110, a private cloud user access system 112, and a private cloud service access system 114. Each of these components is described below.

In one or more examples, the private cloud 100 is a cloud environment deployed for and used by one entity or a particular set of entities. In one or more examples, a cloud environment is a collection of compute resources (e.g., computing devices, network devices, storage devices, various types of software, and the like). As an example, a particular entity, such as a company, may seek to have a cloud environment that employees of the company use for various purposes and/or through which the company provides various services to users. The example private cloud 100 shown in FIG. 1 shows portions of the private cloud 100 that relate to authentication and authorization of users and services of the private cloud 100 to access, invoke, or otherwise use various resources of the private cloud 100, with other portions of the private cloud 100 (e.g., various computing devices, network devices, storage devices, management devices, and the like) not shown in FIG. 1.

A private cloud (e.g., the private cloud 100) may be configured to provide computing resources on-demand to users of the private cloud. To that end, an entity for which the private cloud 100 is deployed may obtain a private cloud platform (e.g., from a private cloud provider), which may include a user interface (e.g., a web-based graphical UI), such as the private cloud user UI 104 (discussed below) which users of the entity may interact with to obtain access to the computing resources of the private cloud.

In one or more examples, within the private cloud 100, any number of services may exist to facilitate the functionality of the private cloud 100 (e.g., VMaaS, BMaaS, monitoring services, security services, network services, storage services, backup services, file and object services, and the like). All or any portion of such services may be provided, for example, by a private cloud provider. In one or more examples, from time to time, such services are configured to invoke other services (e.g., VMaaS may invoke backup services, BMaaS may invoke monitoring services, and the like). In one or more examples, any service of the private cloud 100 that invokes another service of the private cloud 100 may be referred to as the private cloud requesting service 102.

Figure 5:
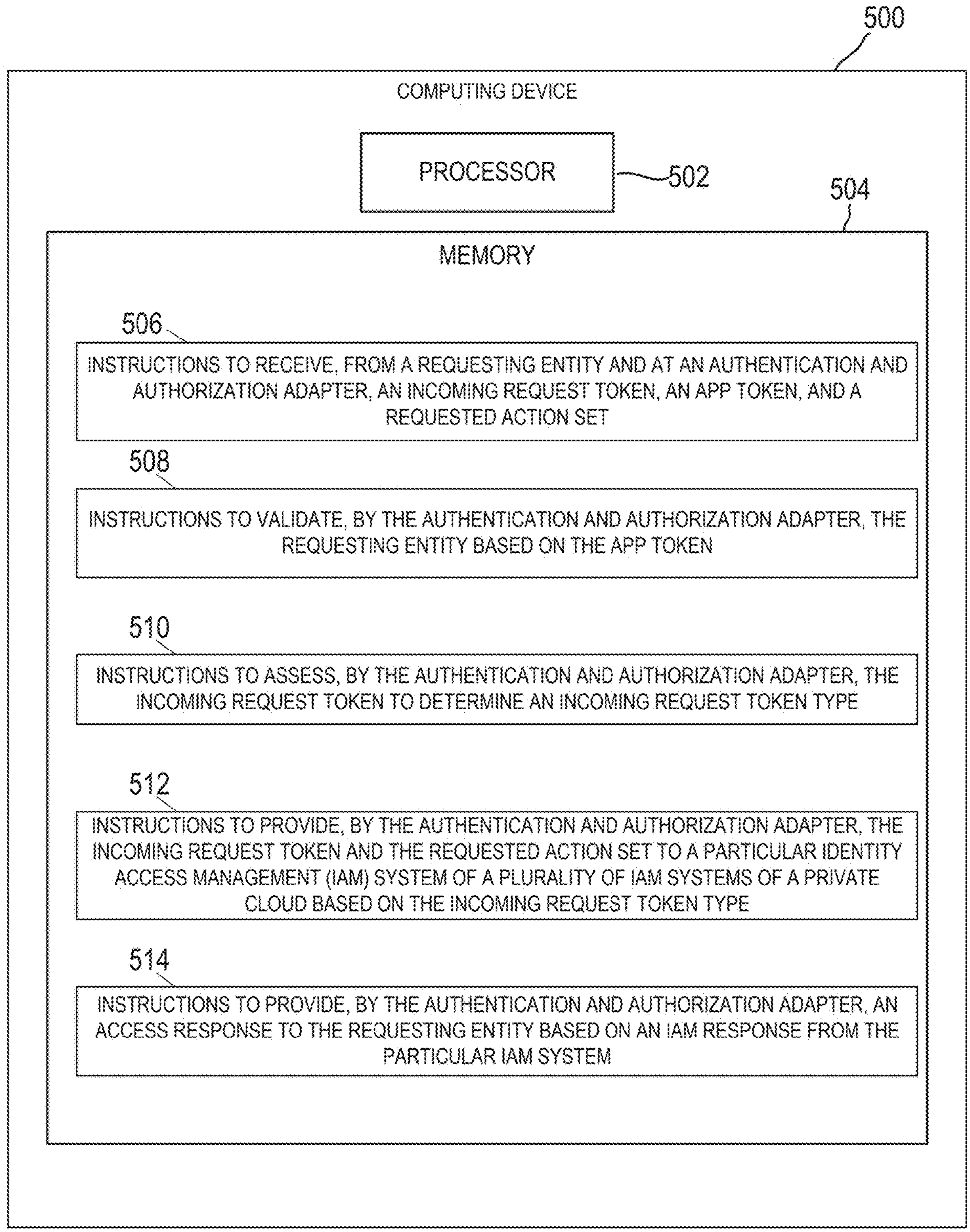
FIG. 5 illustrates a block diagram of a computing device, in accordance with one or more examples disclosed herein.
Figure 6:
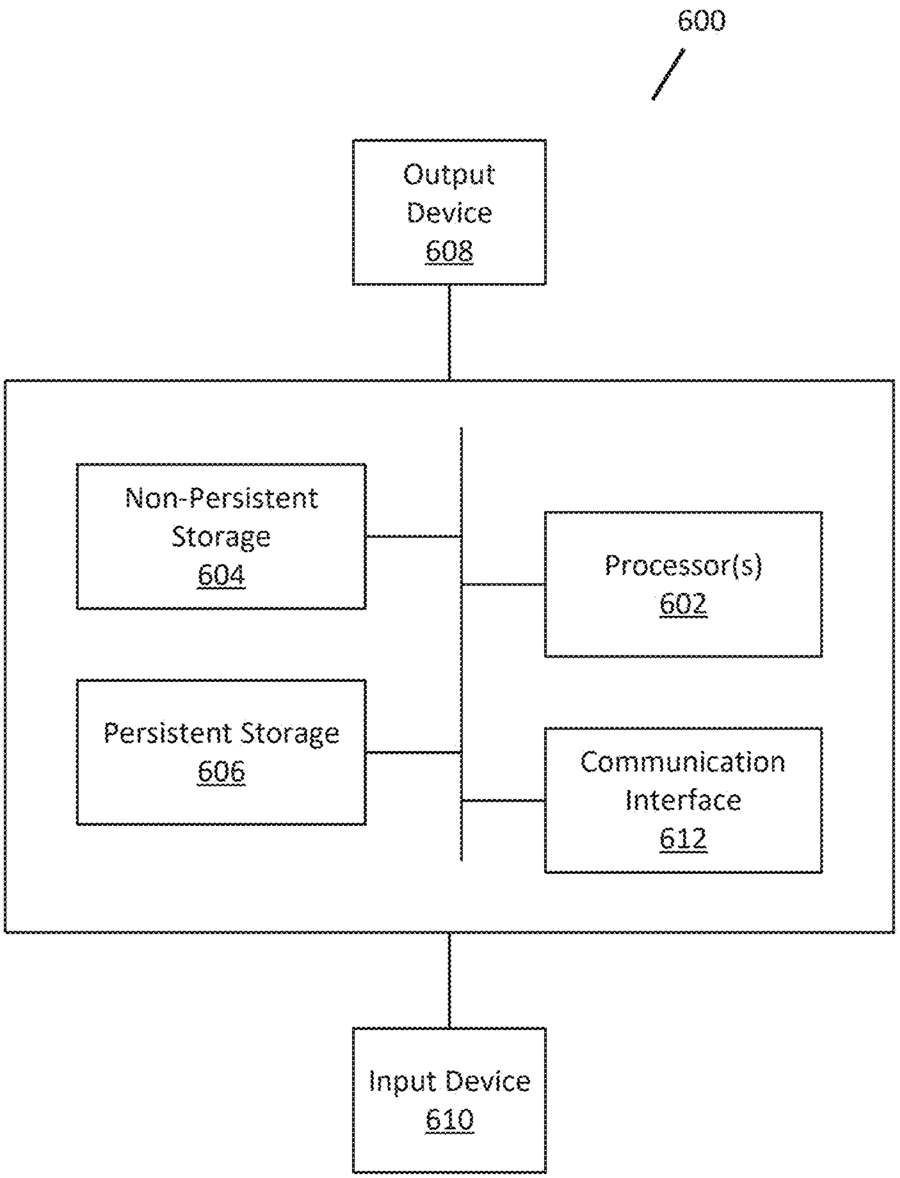
FIG. 6 illustrates a block diagram of a computing device, in accordance with one or more examples disclosed herein.

In one or more examples, the private cloud 100 may include the private cloud user interface 104. In one or more examples, the private cloud user UI 104 is provided from a private cloud provider as part of a private cloud platform, through which users of the private cloud access resources of the private cloud 100. As an example, the private cloud user UI 104 may be a web-based UI that users of the private cloud 100 access as a starting point for accessing resources of the private cloud 100. In one or more examples, the private cloud user UI 104 is implemented, at least in part, on a computing device. In one or more examples, as used herein, a computing device may be any single computing device, a set of computing devices, a portion of one or more computing devices, or any other physical, virtual, and/or logical grouping of computing resources. Non-limiting examples of a computing device are shown in FIG. 5 and FIG. 6 which are described below. In one or more examples, a computing device may be any device of any type that is configured to host all or any portion of one or more applications, micro-services, clustered environment services, storage services, network services, and/or any other computing function, which may include executing instructions, performing operations, executing functions, performing computations, and the like.

In one or more examples, a computing device is any device, portion of a device, or any set of devices capable of electronically processing instructions and may include, but is not limited to, any of the following: one or more processors (e.g. components that include circuitry), memory (e.g., random access memory (RAM)), input and output device(s), non-volatile storage hardware (e.g., solid-state drives (SSDs), persistent memory (Pmem) devices, hard disk drives (HDDs)), one or more physical interfaces (e.g., network ports, storage ports), any number of other hardware components, and/or any combination thereof.

Examples of computing devices include, but are not limited to, a server (e.g., a blade-server in a blade-server chassis, a rack server in a rack, a desktop server, any other type of server device), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, any other type of storage device), a network device, a virtual machine, a virtualized computing environment, a logical container (e.g., for one or more applications), a container pod, an Internet of Things (IoT) device, an array of nodes of computing resources, a super-computing device, a data center or any portion thereof, any combination of the aforementioned items, and/or any other type of computing device. As one of ordinary skill in the art will appreciate, any of the aforementioned examples of computing devices necessarily require at least some hardware components. As an example, a virtual machine, a container, and/or a container pod, when considered as a computing device herein, includes the underlying hardware on which the virtual machine, container, and/or a container pod executes.

In one or more examples, the storage and/or memory of a computing device or system of computing devices may be and/or include one or more data repositories for storing any number of data structures storing any amount of data (e.g., information). In one or more examples, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

Any storage and/or memory of a computing device or system of computing devices may be considered, in whole or in part, as non-transitory computer readable mediums storing software and/or firmware, which, when executed by one or more processors, cause the one or more processors to perform operations (e.g., execution of one or more computer programs) in accordance with one or more examples disclosed herein.

In one or more examples, the private cloud 100 includes the private cloud service component(s) 106. The private cloud service component(s) 106 may be any one or more services implemented within the private cloud 100. The private cloud service component(s) 106 may be implemented using one or more computing devices (discussed above).

The private cloud service component(s) 106 may be a service (e.g., VMaaS, BMaaS, and the like) that are invoked by a user through the private cloud user UI user 104. As an example, a user may navigate to the private cloud user UI 104, and view any number of services of the private cloud that are available to the user. In such a scenario, the user may, within the private cloud user UI 104, select a private cloud service component 106 to invoke that service.

The private cloud service component(s) 106 may, in some implementations, within the private cloud 100, be invoked by other services. As an example, the private cloud requesting service 102 may be a VMaaS service that is configured to backup any number of VMs every four hours. To that end, in one or more examples, the VMaaS service, as the private cloud requesting service 102, may invoke a VM backup service (e.g., the 'requested service') as the private cloud service component 106 to perform the scheduled backups.

In one or more examples, the private cloud 100 includes the app credentials vault 108. The app credentials vault may be a computing device (discussed above) that is configured to provide app credentials to a private cloud service component 106 so that the private cloud service component 106 may request and receive an app token, which the private cloud service component 106 may use to be validated by other components of the private cloud (e.g., an authentication and authorization adapter, a platform identity provider, an access system, and the like). App credentials, obtained from the app credentials vault 108 may be any amount of information of any type that allows the validation of a private cloud service component, such as one or more identifiers, keys, secrets, and the like.

In one or more examples, the private cloud 100 includes the authentication and authorization adapter 110. The authentication and authorization adapter 110 may be a computing device (discussed above) that is configured to receive requests for authentication and authorization from the private cloud service component(s) 106, and to interact with an appropriate access system (e.g., the private cloud user access system 112, the private cloud service access system 114) to allow or deny requests to access resources of the private cloud 100. The authentication and authorization adapter 110 may allow the private cloud service component(s) 106 to have a common authorization flow, regardless of whether they are invoked by a user or by another service, as all requests are routed to the authentication and authorization adapter 110, which is configured to determine what access system to interact with in order to approve or deny a request to access resources of the private cloud 100. Thus, the authentication and authorization adapter 110 may simplify the process of authentication and authorization of services and users to access and use the private cloud service component(s) 106 within the private cloud 100.

In one or more examples, the private cloud 100 includes the private cloud user access system 112, and the private cloud service access system 114. Each of these access systems may be implemented using a computing device (discussed above), and configured to provide authentication of and/or authorization for entities to access resources within the private cloud 100. The private cloud user access system 112 may be configured to authenticate the identity of users, and to authorize users to access resources of the private cloud 100, which may include, for example, including constructs such as workspaces, which may define a common set of private cloud resources to which users have access, and/or roles which may define what actions a set of users may perform.

The private cloud service access system 114 may be a separate access management system that is configured to manage access of services within a private cloud to perform various actions, including accessing and using other services, within the private cloud 100. Thus, for private cloud environments (e.g., the private cloud 100), there may exist any number of private cloud user access systems (e.g., the private cloud user access system 112) and any number of separate private cloud service access systems (e.g., the private cloud service access system 114). In one or more examples, rather than have each user interface, service, application, and the like within the private cloud 100 separately configured to comprehend how to interact with each of the disparate identity access management systems implemented therein, the various user interfaces, services, and applications may be configured to interact with the same authentication and authorization adapter (e.g., the authentication and authorization adapter 110), which, in turn, is configured to interact with the separate identity access management systems (e.g., the private cloud user access system 112, the private cloud service access system 114).

While FIG. 1 shows a particular configuration of devices and/or components, other configurations may be used without departing from the scope of examples described herein. Accordingly, examples disclosed herein should not be limited to the configuration of devices and/or components shown in FIG. 1.

Figure 2:
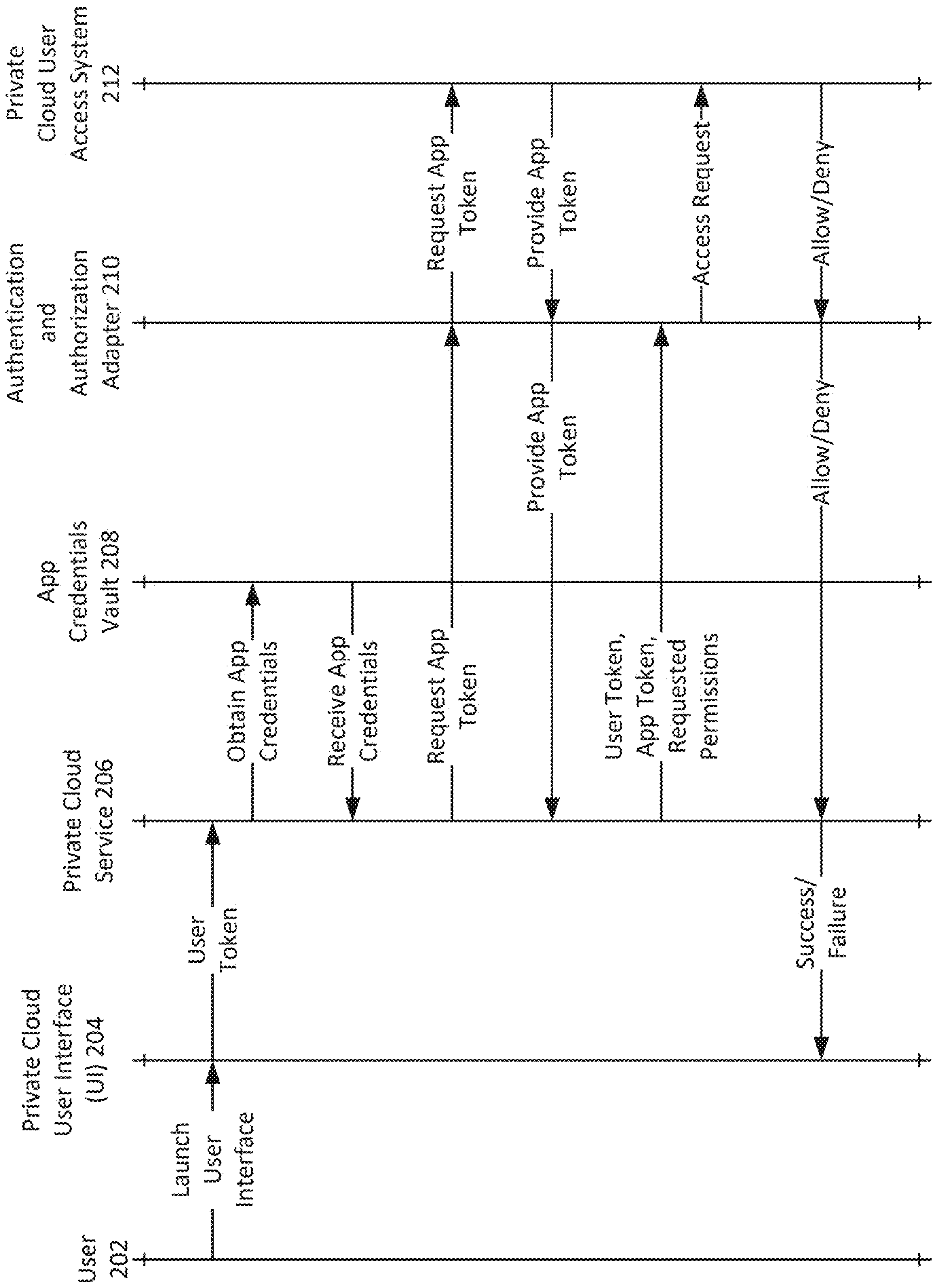
FIG. 2 is a flow diagram showing interactions between components of a private cloud using an authentication and authorization adapter for user access of private cloud resources, in accordance with one or more examples disclosed herein.

FIG. 2 is a flow diagram showing interactions between components of a private cloud using an authentication and authorization adapter for user access of private cloud resources, in accordance with one or more examples disclosed herein.

As shown in FIG. 2, when attempting to access resources in a private cloud (e.g., the private cloud 100 of FIG. 1), a user 202 may first launch a private cloud user UI 204. The private cloud user UI 204 may be, for example, part of a private cloud platform provided by a private cloud provider. The user 202 may login to the private cloud user UI 204 using any appropriate technique, such as, for example, providing a username and password, any form of two factor authentication, and the like. When the user 202 successfully logs in to the private cloud user UI 204, the user may be issued a user token, which is one type of incoming request token. In one or more examples, the user token may include information that allows for verification of the identity of the user 202. The user token may be issued by a private cloud user access system (e.g., the private cloud user access system 112 of FIG. 1), such as, for example, PingFederate. The user token may include an issuer field, in which the private cloud user access system is identified as the issuer of the user token.

The user 202, via the private cloud user UI 204, may select to access a private cloud service 206 within the private cloud (e.g., one of the private cloud service component(s) 106) to perform one or more actions. As an example, a user 202 may access the BMaaS service of the private cloud to read a configuration of bare-metal resources within the private cloud. In one or more examples, when the user 202 attempts to access the private cloud service 206 to perform an action, the private cloud user UI 204 may provide the user token to the private cloud service 206.

In response to receiving a request to perform an action, the private cloud service 206 may obtain an app token. In one or more examples, an app token is a token, separate from the user token, that identifies the private cloud service 206 and allows the private cloud service 206 to be authenticated as a valid service to be requesting the action to be performed. An app token may be issued to a private cloud service 206 when the private cloud service 206 is initially used, or after expiration of a time for which an app token remains valid. Once a private cloud service has an app token, the same app token may be used for any number of requests within a configured time period. In a scenario where the private cloud service 206 does not presently have a valid app token, the private cloud service may obtain app credentials from the app credentials vault 208, which may return the app credentials to the private cloud service 206.

In one or more examples, using the app credentials, the private cloud service may request an app token. In one or more examples, an app token is used as an item of information that validates the identity of the private cloud service 206. In one or more examples, the request for the app token is sent to the authentication and authorization adapter 210, which may interact with a private cloud user access system 212 to request and receive the app token for the private cloud service 206.

In one or more examples, once the private cloud service 206 has been provided the app token, the private cloud service 206 may transmit the user token, the app token, and a set of requested permissions (which may be referred to as a requested action set) to the authentication and authorization adapter 210.

In one or more examples, the authentication and authorization adapter 210 may assess the incoming request token (which is the user token in the present example), and determine an incoming request token type, which is based on the issuer of the incoming request token. The issuer may be determined via examination of an issuer field within the incoming request token. In the present example, the authentication and authorization adapter determines that the issuer of the incoming request token is a private cloud user access system 212, making the incoming request token type a user token. Accordingly, the authentication and authorization adapter 210 may send an access request to the private cloud user access system to determine whether the one or more actions being requested by the user is allowed or denied.

In one or more examples, the access request may include the user token, the requested action set (based on the requested permissions) and the app token. The private cloud user access system may assess the app token to validate the private cloud service 206, and, when the private cloud service 206 is validated, assesses the user token and the requested action set to determine whether the user, who was previously validated in order to receive the user token, is authorized to perform whatever actions are included in the requested action set.

In one or more examples, when the user is not authorized to perform the requested actions (e.g., the user does not have permission to change the configuration of a mare-metal resource of a private cloud), the private cloud user access system 212 may deny the request, and the denial may be returned to the private cloud service 206, which then provides an indication of failure of the requested action to the private cloud user UI 204. When the user is authorized to perform the requested actions (e.g., when the user has permission to view the bare metal configuration of resources in the private cloud), the private cloud user access system 212 may allow the request, and the allowance may be returned to the private cloud service 206. In response to the allowance, the private cloud service 206 may perform the requested actions, and return an indication of success to the private cloud user UI 204.

Figure 3:
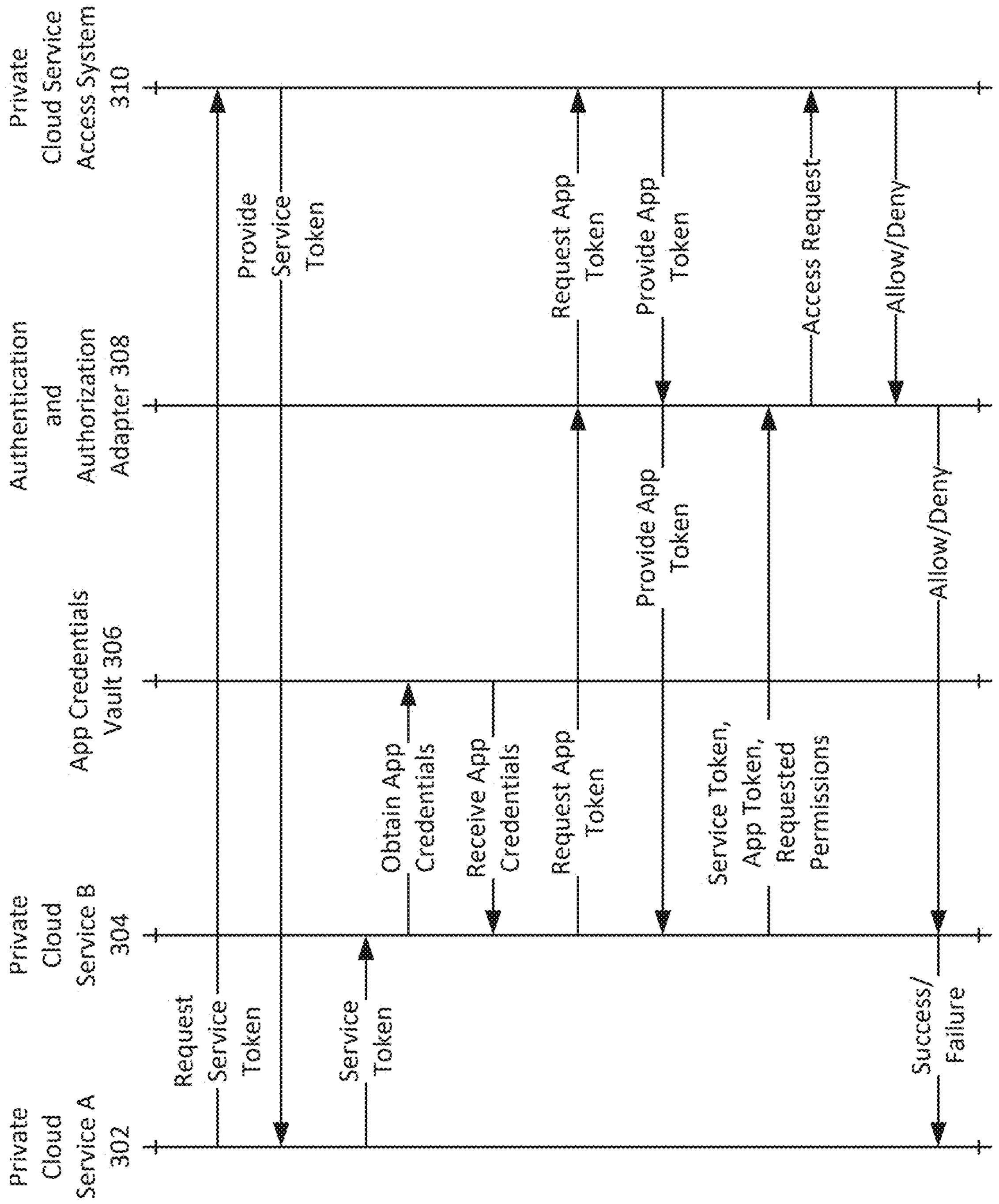
FIG. 3 is a flow diagram showing interactions between components of a private cloud using an authentication and authorization adapter for service access of private cloud resources, in accordance with one or more examples disclosed herein.

FIG. 3 is a flow diagram showing interactions between components of a private cloud using an authentication and authorization adapter for service access of private cloud resources, in accordance with one or more examples disclosed herein.

As shown in FIG. 3, a private cloud service B 304 may seek to invoke another service in a private cloud (e.g., the private cloud 100 of FIG. 1), such as the private cloud service B 304. As an example, the private cloud service A 302 may be a VMaaS service, which is configured to backup various VMs via a backup service of the private cloud, which may be the private cloud service B 304. In such a scenario, the private cloud service A 302 may first request a service token. In one or more examples, a service token is a set of information that allows the private cloud service A 302 to be validated within the private cloud and to determine whether the private cloud service A 302 is authorized to perform whatever set of requested actions the private cloud service A 302 is attempting to perform.

In one or more examples, the private cloud service A 302 requests the service token from the private cloud service access system 310, which is a different access system than an access system implemented within the private cloud for authentication of and/or authorization for users within the private cloud (e.g., the private cloud user access system 212 of FIG. 2). The private cloud service access system (e.g., Keycloak) may provide the service token to the private cloud service A 302, which may then invoke other services of the private cloud using the service token.

In one or more examples, the private cloud service A 302 (e.g., a VMaaS service) provides the service token to the private cloud service B 304 (e.g., a VM backup service), along with a requested action set (e.g., to back up a set of VMs). In one or more examples, the service token is issued by a private cloud service access system (e.g., the private cloud service access system 114 of FIG. 1), such as, for example, Keycloak. In one or more examples, the service token includes an issuer field, in which the private cloud service access system is identified as the issuer of the service token.

In one or more examples, in response to receiving a request to perform an action, the private cloud service B 304 may obtain an app token. In one or more examples, an app token is a token, separate from the service token, that identifies the private cloud service B 304 and allows the private cloud service B 304 to be authenticated as a valid service to be requesting the action to be performed. An app token may be issued to a private cloud service B 304 when the private cloud service B 304 is initially used, or after expiration of a time for which an app token remains valid. Once a private cloud service has an app token, the same app token may be used for any number of requests within a configured time period. In a scenario where the private cloud service B 304 does not presently have a valid app token, the private cloud service may obtain app credentials from the app credentials vault 306, which may return the app credentials to the private cloud service B 304.

In one or more examples, using the app credentials, the private cloud service B 304 may request an app token. In one or more examples, an app token is used as an item of information that validates the identity of the private cloud service 206. In one or more examples, the request for the app token is sent to the authentication and authorization adapter 210, which may interact with a private cloud service access system 310 to request and receive the app token for the private cloud service B 304.

In one or more examples, once the private cloud service B 304 has been provided the app token, the private cloud service B 304 may transmit the service token, the app token, and a set of requested permissions (which may be referred to as a requested action set) to the authentication and authorization adapter 308.

In one or more examples, the authentication and authorization adapter 308 may assess the incoming request token (which is the service token in the present example), and determine an incoming request token type, which is based on the issuer of the incoming request token. In one or more examples, the issuer is determined via examination of an issuer field within the incoming request token. In the present example, the authentication and authorization adapter determines that the issuer of the incoming request token is a private cloud service access system 310, making the incoming request token type a service token. Accordingly, the authentication and authorization adapter 308 may send an access request to the private cloud service access system 310 to determine whether the one or more actions being requested by the private cloud service A 302 is allowed or denied.

In one or more examples, the access request may include the service token, the requested action set (based on the requested permissions), and the app token. In one or more examples, the private cloud service access system 310 assesses the app token to validate the private cloud service B 304, and, when the private cloud service B 304 is validated, assesses the service token and the requested action set to determine whether the private cloud service A 302, which was previously validated in order to receive the service token, is authorized to perform whatever actions are included in the requested action set.

In one or more examples, when the private cloud service A 302 is not authorized to perform the requested actions (e.g., the service does not have permission to perform a VM backup), the private cloud service access system 310 may deny the request, and the denial may be returned to the private cloud service B 304, which may then provide an indication of failure of the requested action to the private cloud service A 302. In one or more examples, when the private cloud service A 302 is authorized to perform the requested actions (e.g., when the service has permission to perform a VM backup), the private cloud service access system 310 may allow the request, and the allowance may be returned to the private cloud service B 304. In response to the allowance, the private cloud service B 304 may perform the requested actions, and return an indication of success to the private cloud service A 302.

Thus, as can be seen via the examples shown in FIG. 2 and FIG. 3, a user accessing services within a private cloud, and a service invoking another service within a private cloud, may be authenticated using different access systems to receive, respectively, a user token or a service token. In one or more examples, the architecture of the private cloud authentication and authorization techniques may be simplified by having requested actions within the private cloud, regardless of whether the actions are requested by a user or a service, sent to the same authentication and authorization adapter, which may determine if the requesting entity is a user or a service, and correspondingly direct the request to the appropriate access system based in the determination of the type of the incoming request token (e.g., user token or service token) provided by the requesting entity.

Figure 4:
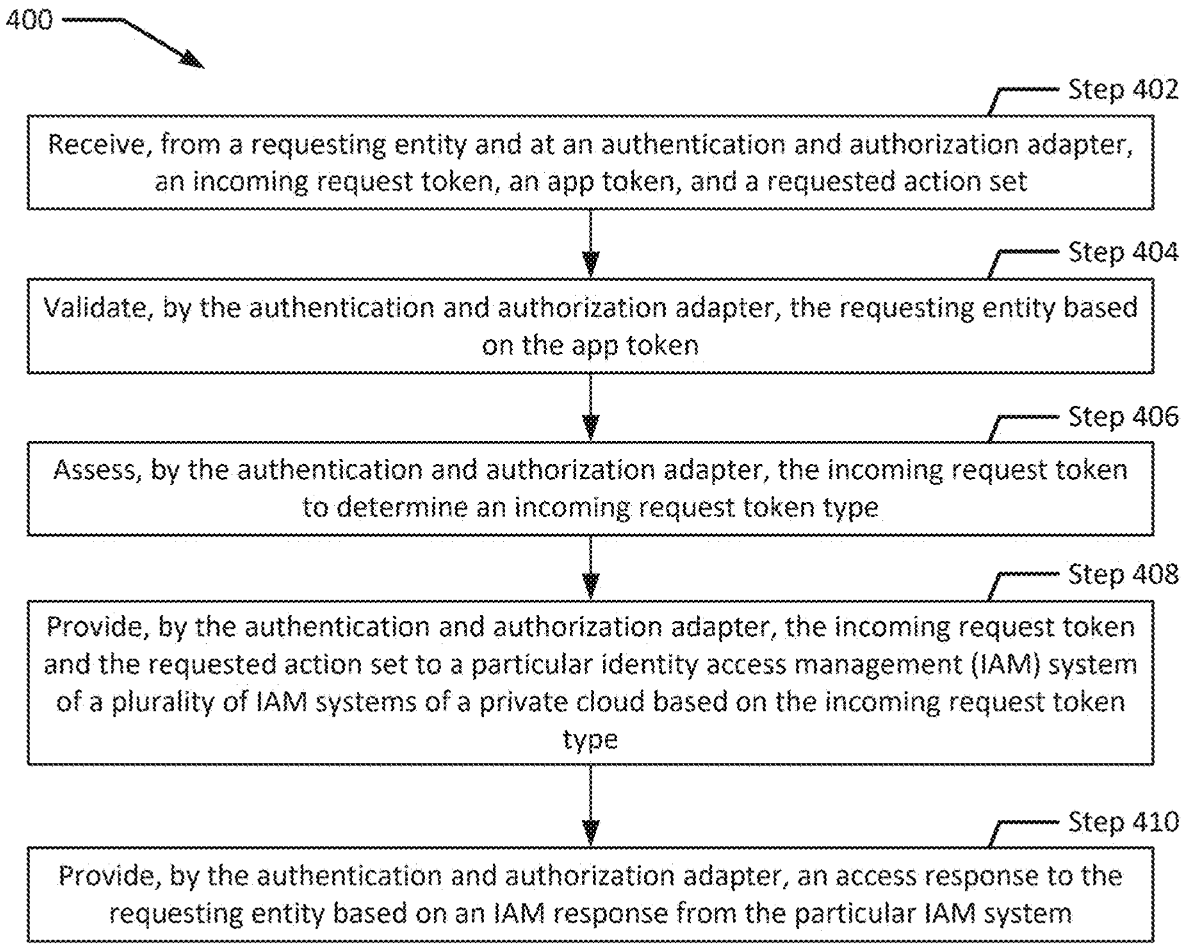
FIG. 4 illustrates an overview of an example method for using an authentication and authorization adapter to service requested action sets in a private cloud environment, in accordance with one or more examples disclosed herein.

FIG. 4 illustrates an overview of an example method 400 for using an authentication and authorization adapter to service requested action sets in a private cloud environment, in accordance with one or more examples disclosed herein.

The method 400 may be performed, at least in part, by one or more devices and/or components of a private cloud (e.g., the private cloud 100 of FIG. 1). As such, all or any portion of the method 300 may be performed, for example, by an authentication and authorization adapter (e.g., the authentication and authorization adapter 110 of FIG. 1, the authentication and authorization adapter 210 of FIG. 2, the authentication and authorization adapter 308 of FIG. 3).

While the various steps in the flowchart shown in FIG. 4 are presented and described sequentially, some or all of the steps may be executed in different orders, some or all of the steps may be combined or omitted, and some or all of the steps may be executed in parallel with other steps of FIG. 4 and/or steps not shown in FIG. 4.

In Step 402, the method 400 includes receiving, from a requesting entity and at an authentication and authorization adapter, an incoming request token, an app token, and a requested action set. In one or more examples, the requesting entity may be a private cloud user UI (e.g., the private cloud user UI 104 of FIG. 1, the private cloud user UI 204 of FIG. 2) that is being accessed by a user (e.g., the user 202 of FIG. 2). In other examples, the requesting entity may be a private cloud service (e.g., the private cloud service B 304 of FIG. 3) that is requested to perform one or more actions by another service of a private cloud (e.g., the private cloud service A 302 of FIG. 3). In one or more examples, the incoming request token, an app token, and a requested action set may be received by an authentication and authorization adapter (e.g., the authentication and authorization adapter 110 of FIG. 1, the authentication and authorization adapter 210 of FIG. 2, the authentication and authorization adapter 308 of FIG. 3).

In one or more examples, the incoming request token may be a user token that is issued for a user by a private cloud user access system, such as PingFederate, (e.g., the private cloud user access system 112 of FIG. 1, the private cloud user access system 212 of FIG. 2). In one or more examples, the incoming request token may be issued for a private cloud service by a private cloud service access system (e.g., the private cloud service access system 114 of FIG. 1, the private cloud service access system 310 of FIG. 3). In one or more example, incoming request token may be for use in validating the identity of the requesting entity, the app token may be used for validating the private cloud service that is to perform the actions of the requested action set, and the requested action set may be a set of one or more actions that the requesting entity is requesting to perform.

In Step 404, the method 400 includes validating, by the authentication and authorization adapter (e.g., the authentication and authorization adapter 110 of FIG. 1, the authentication and authorization adapter 210 of FIG. 2, the authentication and authorization adapter 308 of FIG. 3), the requesting entity based on the app token. In one or more examples, the app token may be obtained by a private cloud service that has been requested to perform one or more actions by a user or by another service. In one or more examples, validating the requesting entity may be performed by the authentication and authorization adapter by providing the app token to an access service of the private cloud.

In Step 406, the method 400 includes assessing, by the authentication and authorization adapter (e.g., the authentication and authorization adapter 110 of FIG. 1, the authentication and authorization adapter 210 of FIG. 2, the authentication and authorization adapter 308 of FIG. 3), the incoming request token to determine an incoming request token type. In one or more examples, the incoming request token type is determined by the authentication and authorization adapter based on an issuer field within the incoming request token. In one or more examples, when the issuer field indicates that the incoming request token is issued by a private cloud user access system, the incoming request token type is a user token. In one or more examples, when the issuer field indicates that the incoming request token is issued by a private cloud service access system, the incoming request token type is a service token.

In Step 408, the method 400 includes providing, by the authentication and authorization adapter (e.g., the authentication and authorization adapter 110 of FIG. 1, the authentication and authorization adapter 210 of FIG. 2, the authentication and authorization adapter 308 of FIG. 3), the incoming request token and the requested action set to a particular identity access management (IAM) system (e.g., the private cloud user access system 112 of FIG. 1, the private cloud user access system 212 of FIG. 2, the private cloud service access system 114 of FIG. 1, the private cloud service access system 310 of FIG. 3) of a plurality of IAM systems of a private cloud (e.g., the private cloud 100 of FIG. 1) based on the incoming request token type. In one or more examples, the authentication and authorization adapter may also provide the app token to the particular IAM access system. In one or more examples, the particular IAM access system may assess the incoming token and the requested access set to determine whether the requesting entity is authorized to perform the one or more actions requested as part of the requested action set.

In Step 410, the method 400 includes providing, by the authentication and authorization adapter (e.g., the authentication and authorization adapter 110 of FIG. 1, the authentication and authorization adapter 210 of FIG. 2, the authentication and authorization adapter 308 of FIG. 3), an access response to the requesting entity based on an IAM response from the particular IAM system. In one or more examples, an access response includes an allowance or denial of all or any portion of the actions requested in the requested action set. In one or more examples, an IAM response includes a response provided to the authentication and authorization adapter from whichever IAM system was determined as the appropriate IAM system to receive the request based on the issuer field of the incoming request token.

FIG. 5 illustrates a block diagram of a computing device 500, in accordance with one or more examples disclosed herein. The computing device 500 may be an example of the various computing devices (e.g., the private cloud requesting service 102 of FIG. 1, the private cloud user UI user 104 of FIG. 1, the private cloud service component(s) 106 of FIG. 1, the app credentials vault 108 of FIG. 1, the authentication and authorization adapter 110 of FIG. 1, the private cloud user access system 112 of FIG. 1, the private cloud service access system 114 of FIG. 1) described above and/or of the computing device 500, described below. As discussed above in the descriptions of FIG. 1, FIG. 2, FIG. 3, and FIG. 4 the computing device 500 may be used to implement all or any portion of the various components shown in FIG. 1, FIG. 2, and/or FIG. 3 and described above and/or to perform all or any portion of the method 400 shown in FIG. 4 and described above.

The computing device 500 may include one or more processors 502 and memory 504. The memory 504 may include a non-transitory computer-readable medium that stores programming for execution by one or more of the one or more processors 502. In this implementation, one or more modules within the computing device 500 may be partially or wholly embodied as software for performing any functionality described in this disclosure. The computing device 500 may be, for example, configured to perform the method 400 shown in FIG. 4 and described above, by executing instructions included in the memory 504 and executed by the one or more processors 502.

For example, the memory 504 may include instructions 506 to receive, from a requesting entity and at an authentication and authorization adapter, an incoming request token, an app token, and a requested action set (e.g., as described above in reference to Step 402 of FIG. 4).

For example, the memory 504 may include instructions 508 to validate, by the authentication and authorization adapter, the requesting entity based on the app token (e.g., as described above in reference to Step 404 of FIG. 4).

For example, the memory 504 may include instructions 510 to assess, by the authentication and authorization adapter, the incoming request token to determine an incoming request token type (e.g., as described above in reference to Step 406 of FIG. 4).

For example, the memory 504 may include instructions 512 to provide, by the authentication and authorization adapter, the incoming request token and the requested action set to a particular identity access management (IAM) system of a plurality of IAM systems of a private cloud based on the incoming request token type (e.g., as described above in reference to Step 408 of FIG. 4).

For example, the memory 504 may include instructions 512 to provide, by the authentication and authorization adapter, an access response to the requesting entity based on an IAM response from the particular IAM system (e.g., as described above in reference to Step 410 of FIG. 4).

FIG. 6 illustrates a block diagram of a computing device, in accordance with one or more examples of this disclosure. As discussed above, examples described herein may be implemented, at least in part, using computing devices, and the computing device 600 shown in FIG. 6 may be such a computing device. For example, all or any portion of the components shown in FIG. 1 (e.g., the private cloud requesting service 102 of FIG. 1, the private cloud user UI 104 of FIG. 1, the private cloud service component(s) 106 of FIG. 1, the app credentials vault 108 of FIG. 1, the authentication and authorization adapter 110 of FIG. 1, the private cloud user access system 112 of FIG. 1, the private cloud service access system 114 of FIG. 1), FIG. 2, and/or FIG. 3 may be implemented, at least in part using a computing device such as the computing device 600, and may include all or any portion of the components of the computing device 600 shown in FIG. 6 and described below.

In one or more examples, a computing device (e.g., the computing device 600) is any device, portion of a device, or any set of devices capable of electronically processing instructions and may include, but is not limited to, any of the following: one or more processors (e.g. components that include circuitry) (e.g., the processor 602), memory (e.g., random access memory (RAM)) (not shown), input and output device(s) (e.g., the non-persistent storage 606), non-volatile storage hardware (e.g., solid-state drives (SSDs), persistent memory (Pmem) devices, hard disk drives (HDDs) (not shown)), one or more physical interfaces (e.g., network ports, storage ports) (e.g., the persistent storage 606), any number of other hardware components (not shown), and/or any combination thereof. As used herein, a processor may be any component that can be configured to execute operations, processes, threads, and the like. In some examples, a computing device (e.g., the computing device 600) may include any number of heterogeneous processors.

The computing device 600 may include a communication interface 612 (e.g., Bluetooth interface, infrared interface, network interface, optical interface, any other type of communication interface), input devices 610, output devices 608, and numerous other elements (not shown) and functionalities. Each of these components is described below.

In one or more examples, the computer processor(s) 602 may be an integrated circuit for processing instructions. For example, the computer processor(s) may be one or more cores or micro-cores of a processor. The processor 602 may be a general-purpose processor configured to execute program code included in software executing on the computing device 600. The processor 602 may be a special purpose processor where certain instructions are incorporated into the processor design. The processor 602 may be a central processing unit (CPU), a multi-core CPU, an application specific integrated circuit (ASIC), a graphics processing unit (GPU), a data processing unit (DPU), a tensor processing units (TPU), an associative processing unit (APU), a vision processing units (VPU), a quantum processing unit (QPU), and/or various other processing units that use special purpose hardware (e.g., field programmable gate arrays (FPGAs), System-on-a-Chips (SOCs), digital signal processors (DSPs)). Although only one processor 602 is shown in FIG.

6, the computing device 600 may include any number of processors without departing from the scope of examples disclosed herein.

The computing device 600 may also include one or more input devices 610, such as a touchscreen, keyboard, mouse, microphone, touchpad, electronic pen, motion sensor, or any other type of input device. The input devices 610 may allow a user to interact with the computing device 600. In one or more examples, the computing device 600 may include one or more output devices 608, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 602, non-persistent storage 604, and persistent storage 606. Many different types of computing devices exist, and the aforementioned input and output device(s) may take other forms. In some instances, multimodal systems can allow a user to provide multiple types of input/output to communicate with the computing device 600.

Further, the communication interface 612 may facilitate connecting the computing device 600 to a network (not shown) (e.g., a local area network (LAN), a wide area network (WAN) such as the Internet, mobile network, or any other type of network) and/or to another device, such as another computing device. The communication interface 612 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 612 may also include one or more Global Navigation Satellite System (GNSS) receivers or transceivers that are used to determine a location of the computing device 600 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, or the like.

All or any portion of the components of the computing device 600 may be implemented in circuitry. For example, the components can include and/or can be implemented using electronic circuits or other electronic hardware, which can include one or more programmable electronic circuits (e.g., microprocessors, GPUs, DSPs, FPGAs, CPUs, CAMs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples described herein. It will be understood by those skilled in the art (who also have the benefit of this disclosure) that one or more examples described herein may be practiced without these specific details, and that numerous variations or modifications may be possible without departing from the scope of the examples described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of examples disclosed herein.

Individual aspects may be described above as a process or method which is depicted as a flowchart, a flow diagram, a data flow diagram, a structure diagram, or a block diagram.

Although a flowchart or flow diagram may describe the operations as a sequential process, many of the operations can be performed in parallel or concurrently. In addition, the order of the operations may be re-arranged. A process may be terminated when its operations are completed, but may have additional steps not included in a drawing. A process may correspond to a method, a function, a procedure, a subroutine, a subprogram, and the like. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, a network device, or a processing device (e.g., one or more processors) to perform a certain function or group of functions. Portions of computer resources used can be accessible over a network. The computer executable instructions may be, for example, binaries, intermediate format instructions such as assembly language, firmware, source code, and the like. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various examples described herein, may be equivalent to one or more same or similarly named and/or numbered components described with regard to any other figure. For brevity, descriptions of these components may not be repeated with regard to each figure. Thus, each and every example of the components of each figure is incorporated by reference and assumed to be optionally present within every other figure having one or more same or similarly named and/or numbered components. Additionally, in accordance with various examples described herein, any description of the components of a figure is to be interpreted as an optional example, which may be implemented in addition to, in conjunction with, or in place of the examples described with regard to a corresponding one or more same or similarly named and/or numbered component in any other figure.

Throughout the application, ordinal numbers (e.g., first, second, third) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operative connection, and variations thereof, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While examples discussed herein have been described with respect to a limited number of examples, those skilled in the art, having the benefit of this disclosure, will appreciate that other examples can be devised which do not depart from the scope of examples as disclosed herein. Accordingly, the scope of examples described herein should be limited only by the attached claims.

What is claimed is:

1. A system, comprising:

one or more processors; and one or more non-transitory computer readable media storing instructions which, when executed by the one or more processors, cause the one or more processors to:

receive, from a first private cloud service of a private cloud and at an authentication and authorization adapter of the private cloud, an incoming request token, an app token, and a requested action set, wherein, prior to the authentication and authorization adapter receiving the incoming request token, the app token, and the requested action set:

the app token is obtained by the first private cloud service using app credentials obtained from an app credentials vault of the private cloud, the app token is obtained in response to an app token request that includes the app credentials and is sent from the first private cloud service to the authentication and authorization adapter and from the authentication and authorization adapter to a particular identity access management (IAM) system of a plurality of IAM systems of the private cloud, and the app token is provided to the first private cloud service, in response to the app token request, by the particular IAM system via the authentication and authorization adapter;

assess, by the authentication and authorization adapter, the incoming request token to determine an incoming request token type;

provide, by the authentication and authorization adapter, the incoming request token and the requested action set to the particular IAM system of the plurality of IAM systems of the private cloud based on the incoming request token type;

provide the app token to the particular IAM system in addition to the incoming request token and the requested action set; and provide, by the authentication and authorization adapter, an access response to the first private cloud service based on an IAM response from the particular IAM system.

2. The system of claim 1, wherein execution of the instructions further causes the one or more processors to validate the first private cloud service based on the app token.

3. The system of claim 1, wherein the authentication and authorization adapter determines the incoming request token type based on an issuer field within the incoming request token.

4. The system of claim 3, wherein:

the first private cloud service is a service of the private cloud that a user of the private cloud is seeking to access, when the first private cloud service is the service that the user is seeking to access, the issuer field of the incoming request token indicates a first issuer associated with user authentication and authorization, and the particular IAM system is a user IAM system of the private cloud.

5. The system of claim 3, wherein:

the first private cloud service is a service of the private cloud that a second private cloud service of the private cloud is seeking to access, when the first private cloud service is the service that the second private cloud service is seeking to access, the issuer field of the incoming request token indicates a second issuer associated with service authentication and authorization, and the particular IAM system is a service IAM system of the private cloud.

6. The system of claim 1, wherein to provide, by the authentication and authorization adapter, the incoming request token and the requested action set to the particular IAM system based on the incoming request token type, execution of the instructions further causes the one or processors to:

provide the incoming request token and the requested action set to a first IAM system of the plurality of IAM systems of the private cloud based on the incoming request token being associated with a user, wherein the first IAM system corresponds to users of the private cloud; and provide a second incoming request token and a second requested action set to a second IAM system of the plurality of IAM systems of the private cloud based on the second incoming request token being associated with a particular private cloud service that is seeking to access a second private cloud service, wherein the second IAM system corresponds to services of the private cloud.

7. A computer-implemented method, comprising:

receiving, from a first private cloud service of a private cloud and at an authentication and authorization adapter of the private cloud, an incoming request token, an app token, and a requested action set, wherein, prior to the authentication and authorization adapter receiving the incoming request token, the app token, and the requested action set:

the app token is obtained by the first private cloud service using app credentials obtained from an app credentials vault of the private cloud, the app token is obtained in response to an app token request that includes the app credentials and is sent from the first private cloud service to the authentication and authorization adapter and from the authentication and authorization adapter to a particular identity access management (IAM) system of a plurality of IAM systems of the private cloud, and the app token is provided to the first private cloud service, in response to the app token request, by the particular IAM system via the authentication and authorization adapter;

assessing, by the authentication and authorization adapter, the incoming request token to determine an incoming request token type;

providing, by the authentication and authorization adapter, the incoming request token and the requested action set to the particular IAM system of the plurality of IAM systems of the private cloud based on the incoming request token type;

providing the app token to the particular IAM system in addition to the incoming request token and the requested action set; and providing, by the authentication and authorization adapter, an access response to the first private cloud service based on an IAM response from the particular IAM system.

8. The computer-implemented method of claim 7, further comprising validating the first private cloud service based on the app token.

9. The computer-implemented method of claim 7, wherein the authentication and authorization adapter determines the incoming request token type based on an issuer field within the incoming request token.

10. The computer-implemented method of claim 9, wherein:

the first private cloud service is a service of the private cloud that a user of the private cloud is seeking to access, when the first private cloud service is the service that the user is seeking to access, the issuer field of the incoming request token indicates a first issuer associated with user authentication and authorization, and the particular IAM system is a user IAM system of the private cloud.

11. The computer-implemented method of claim 9, wherein:

the first private cloud service is a service of the private cloud that a second private cloud service of the private cloud is seeking to access, when the first private cloud service is the service that the second private cloud service is seeking to access, the issuer field of the incoming request token indicates a second issuer associated with service authentication and authorization, and the particular IAM system is a service IAM system of the private cloud.

12. The computer-implemented method of claim 7, wherein providing, by the authentication and authorization adapter, the incoming request token and the requested action set to the particular IAM system based on the incoming request token type comprises:

providing the incoming request token and the requested action set to a first IAM system of the plurality of IAM systems of the private cloud based on the incoming request token being associated with a user, wherein the first IAM system corresponds to users of the private cloud; and providing a second incoming request token and a second requested action set to a second IAM system of the plurality of IAM systems of the private cloud based on the second incoming request token being associated with a particular private cloud service that is seeking to access a second private cloud service, wherein the second IAM system corresponds to services of the private cloud.

13. A non-transitory computer-readable medium storing programming for execution by one or more processors, the programming comprising instructions to:

receive, from a first private cloud service of a private cloud and at an authentication and authorization adapter of the private cloud, an incoming request token, an app token, and a requested action set, wherein, prior to the authentication and authorization adapter receiving the incoming request token, the app token, and the requested action set:

the app token is obtained by the first private cloud service using app credentials obtained from an app credentials vault of the private cloud, the app token is obtained in response to an app token request that includes the app credentials and is sent from the first private cloud service to the authentication and authorization adapter and from the authentication and authorization adapter to a particular identity access management (IAM) system of a plurality of IAM systems of the private cloud, and the app token is provided to the first private cloud service, in response to the app token request, by the particular IAM system via the authentication and authorization adapter;

assess, by the authentication and authorization adapter, the incoming request token to determine an incoming request token type;

provide, by the authentication and authorization adapter, the incoming request token and the requested action set to the particular IAM system of the plurality of IAM systems of the private cloud based on the incoming request token type;

provide the app token to the particular IAM system in addition to the incoming request token and the requested action set; and provide, by the authentication and authorization adapter, an access response to the first private cloud service based on an IAM response from the particular IAM system.

14. The non-transitory computer-readable medium of claim 13, wherein the programming comprises further instructions to validate the first private cloud service based on the app token.

15. The non-transitory computer-readable medium of claim 13, wherein the authentication and authorization adapter determines the incoming request token type based on an issuer field within the incoming request token.

16. The non-transitory computer-readable medium of claim 15, wherein:

the first private cloud service is a service of the private cloud that a user of the private cloud is seeking to access, when the first private cloud service is the service that the user is seeking to access, the issuer field of the incoming request token indicates a first issuer associated with user authentication and authorization, and the particular IAM system is a user IAM system of the private cloud.

17. The non-transitory computer-readable medium of claim 15, wherein:

the first private cloud service is a service of the private cloud that a second private cloud service of the private cloud is seeking to access, when the first private cloud service is the service that the second private cloud service is seeking to access, the issuer field of the incoming request token indicates a second issuer associated with service authentication and authorization, and the particular IAM system is a service IAM system of the private cloud.

* * * * *